M. MURRAY.
EDUCATIONAL DEVICE.
APPLICATION FILED NOV. 4, 1919.

1,405,063.  Patented Jan. 31, 1922.

INVENTOR
MADELINE MURRAY.

BY Geo. H. Strong
ATTORNEY

UNITED STATES PATENT OFFICE.

MADELINE MURRAY, OF SAN FRANCISCO, CALIFORNIA.

EDUCATIONAL DEVICE.

1,405,063.  Specification of Letters Patent.  Patented Jan. 31, 1922.

Application filed November 4, 1919. Serial No. 335,589.

*To all whom it may concern:*

Be it known that I, MADELINE MURRAY, a citizen of the United States, residing at the city and county of San Francisco and State of California, have invented new and useful Improvements in Educational Devices, of which the following is a specification.

This invention relates to an educational device and especially a device for the amusement and instruction of children.

One of the objects of the present invention is to provide an educational device which embodies features whereby the child is given instruction or training of a rudimental nature, for instance, in spelling, reading, arithmetic and the like, and whereby its sense of observation is materially promoted.

Another object of the invention is to provide a device, of the character described, whereby children may be induced and enabled with the spirit of play to fix in their minds and become thoroughly familiar with the forms of letters, words, figures and objects, and whereby they may be held busily occupied during such periods when the parent or teacher cannot devote their full time and attention to the work of teaching the child.

The invention briefly stated may be said to consist of three varieties of cards, to-wit: picture cards, word or numeral cards, and a set of test cards, a suitable container for the reception of the cards in which they may be neatly and orderly arranged when not in use, and a receiver in which the cards are inserted and displayed when the device is being used.

The method of employing the cards, etc., or teaching the child will later be described.

The invention consists of the parts and the construction, combination and arrangement of parts as hereinafter more fully described and claimed, having reference to the accompanying drawings, in which—

Figure 1:
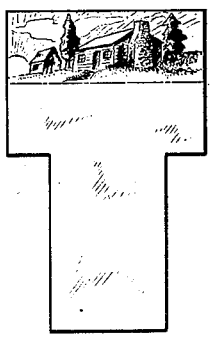
Fig. 1 is a view of the picture card.

Referring to the drawings in detail, A indicates a card or holder constructed of card board or any other suitable material. Formed in the face of this card is a series of aligned slots, 2, and forming a backing for the card is a cloth or paper lining generally indicated at 3.

The device as briefly stated is essentially intended for instruction or training of a rudimental nature, for instance, for such children as attend kindergarten or the first grades of school, the object being to fix in the minds of the children the forms of letters, words, numerals and objects by comparison of letters, words, etc., with the pictures. I therefore provide a series of picture cards such as shown in Figure 1, a series of word cards corresponding thereto as shown in Figure 2, and a series of test cards such as shown in Figure 3, whereby it becomes possible to test or correct the work of any individual child.

Another purpose of the invention is to materially promote the sense of observation and also to teach the child the rudimentary meaning of system and orderliness. I therefore provide a container such as shown in Figure 4 for the reception of the cards indicated in Figures 1, 2 and 3. The container shown in the present instance is booklike in form and is provided with a series of pockets for the reception of the cards, for instance, the word cards may be inserted in one row, the picture cards in another and the test cards in a third row. I of course wish it understood as many rows as desired may be provided for each set of cards.

Figure 4:
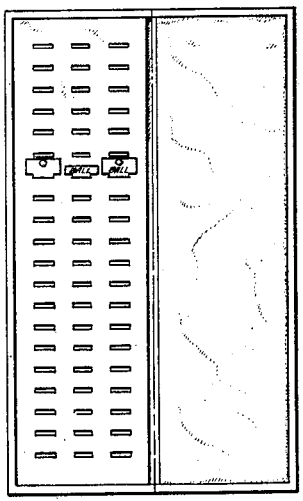
Fig. 4 is a view of the pocket book or container in which the cards are inserted when not in use.
Figure 5:
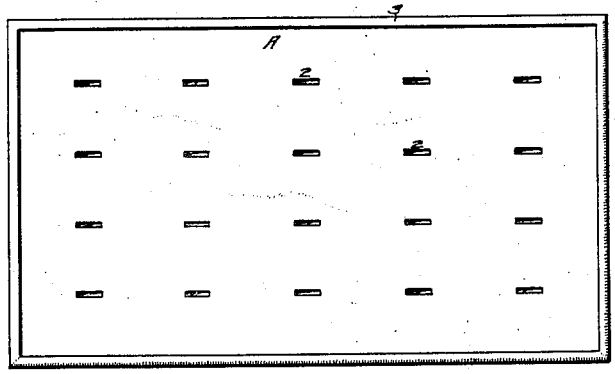
Fig. 5 is a view of the work card or receiver for the reception of the cards shown in Figures 1, 2 and 3.
Figure 6:
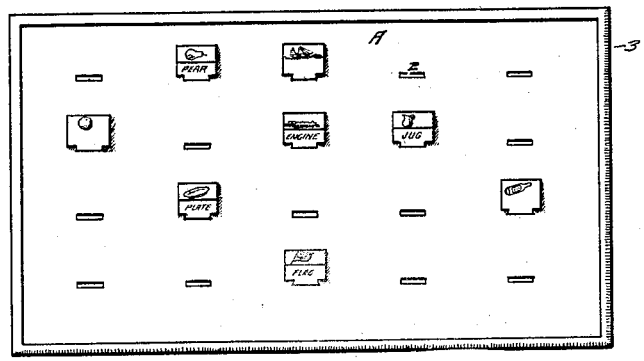
Fig. 6 is a view similar to Figure 5 showing a number of picture and word cards inserted.

The device may be used in the following manner: The child may first be told to remove the picture cards from the holder shown in Figure 4, and to insert them one by one in row formation in the pockets, 2, formed in the receiver shown in Figure 5, and then to remove the word cards one by one and insert them in the pockets, 2, where they will match the picture cards, for instance the word card "ball" will be inserted in the same pocket as the picture card which contains a picture of a ball, the word card "house" in a pocket which contains a picture card having a house displayed thereon, and so on. After this has been accomplished the work of correction is commenced. The correction may be accomplished by the child who has arranged the cards, or the receivers A may be interchanged so that the children will correct each other's work. This is accomplished by means of the checking or correcting cards shown in Figure 3. The picture card containing a picture of a "ball" may first be selected and the work checked by comparing the check card with the two cards contained in the pocket of the receiver A. If they are not correct the check card is inserted showing that a mistake has been made. All the cards are checked in this manner and the child whose card shows the smallest number of check cards has therefore accomplished the best work and in a spirit of play may be said to have won the game, as practice and experience has determined that a spirit of competition and play is inducive to accomplish the best results.

Figure 2:
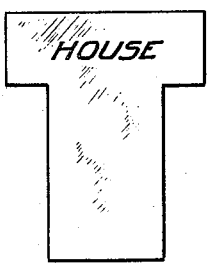
Fig. 2 is a view of the word or numeral card.
Figure 3:
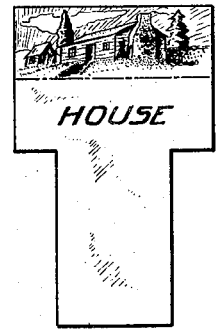
Fig. 3 is a view of the test card.

By referring to Figures 1, 2 and 3, it will be seen that each card is provided with a head extension. For instance, the head extension formed on the picture card shown in Figure 1 is twice as high as the head extension on the word card shown in Figure 2. This is of considerable importance as it first of all prevents the cards when inserted in the pockets, 2, from passing clear through the same, and secondly it is of importance as it separates the words and pictures so that they will both be clearly displayed when inserted in the pockets of the receiver A.

The card shown in Figure 3 is preferably colored to distinguish it from the word and picture cards shown in Figures 1 and 2, and while I prefer that the word and picture cards should be white, it is obvious that any other color desired will be provided, similarly that the materials and finish of the several parts employed may be such as the experience and judgment of the manufacturer may dictate or various conditions may demand.

The receiver A has been described as constructed of card board, but it should be obvious that any other material may be employed, and while the pockets are here shown in row formation, it is possible that other formations might be desirable.

While I prefer a book shaped container for the reception of the cards when not in use, it is obvious that any other suitable container might be employed. I however prefer a book shaped holder as it materially promotes the possibility of teaching system and orderliness.

Having thus described my invention, what I claim and desire to secure by Letters Patent is—

1. An educational device comprising a receiver having a series of pockets formed therein, a picture card and a word card insertible in each pocket, and a test card insertible in each pocket, said test card having both a picture and a word printed thereon, whereby it may be ascertained whether the picture and word cards first inserted in the pockets match each other.

2. An educational device comprising a receiver having a series of pockets formed therein, a picture card and a word card insertible in each pocket, a test card insertible in each pocket, said test card having both a picture and a word printed thereon, whereby it may be ascertained whether the picture and word cards first inserted in the pockets match each other, and a container for the reception of the picture card, the word card and the test card, said container being provided with pockets wherein the cards may be separately arranged and classified.

3. In a device of the character described, a plate-shaped receiver, said plate having a series of aligned slots formed therein serving as receiving pockets, a picture card and a word card insertible in each receiving pocket so as to each be within the pocket at the same time, and a head member on each card extending laterally with relation to the body portion of each card to form a stop which will prevent the cards from slipping clear down into or through the pockets, said heads being formed so that when the cards are in the pocket, the picture and word will each be exposed for reading.

4. In a device of the character described, a plate-shaped receiver, said plate having a series of aligned slots formed therein serving as receiving pockets, a picture card and a word card insertible in each receiving pocket, and a head member on each card extending laterally with relation to the body portion of each card to form a stop which will prevent the cards from slipping clear down into or through the pockets, the head member on one card being higher than the head member on the other card.

5. In a device of the character described, a plate-shaped receiver, said plate having a series of aligned slots formed therein serving as receiving pockets, a picture card and a word card insertible in each receiving pocket, a head member on each card extending laterally with relation to the body portion of each card to form a stop which will prevent the cards from slipping clear down into or through the pockets, the head member on one card being higher than the head member on the other card, and a test card insertible in each pocket, said test card having both a picture and a word printed thereon.

6. In a device of the character described, a plate-shaped receiver, said plate having a series of aligned slots formed therein serving as receiving pockets, a picture card and a word card insertible in each receiving pocket, a head member on each card extending laterally with relation to the body portion of each card to form a stop which will prevent the cards from slipping clear down into or through the pockets, the head member on one card being higher than the head member on the other card, a test card insertible in each pocket, said test card having both a picture and a word printed thereon, and a book-shaped container for the reception of the cards, said book-shaped container having pockets formed therein for the reception of the cards and to permit the cards to be separately arranged and classified.

7. In a device of the character described, a separate picture card and a word card, said cards having heads formed thereon, the head on one card being higher than the head on the other card to permit the picture and word to be clearly displayed and separated one with relation to the other.

In testimony whereof I have hereunto set my hand in the presence of two subscribing witnesses.

MADELINE MURRAY.

Witnesses:
W. W. HEALEY,
M. E. EWING.